(12) United States Patent
Yasue et al.

(10) Patent No.: US 7,946,844 B2
(45) Date of Patent: May 24, 2011

(54) HEAT ACCUMULATING-TYPE BURNER

(75) Inventors: Takashi Yasue, Nagoya (JP); Masami Sato, Nagoya (JP); Hitoshi Mori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 376 days.

(21) Appl. No.: 12/043,986

(22) Filed: Mar. 7, 2008

(65) Prior Publication Data

US 2008/0233524 A1   Sep. 25, 2008

(30) Foreign Application Priority Data

Mar. 19, 2007   (JP) ................................. 2007-069802

(51) Int. Cl.
*F28D 17/02* (2006.01)
*F28D 17/00* (2006.01)

(52) U.S. Cl. .......... 431/11; 431/207; 431/211; 431/215; 431/242; 432/179; 432/180; 432/181

(58) Field of Classification Search ................... 432/181, 432/180, 179; 431/11, 207, 211, 215, 242
See application file for complete search history.

(56) References Cited

U.S. PATENT DOCUMENTS

| | | | | |
|---|---|---|---|---|
| 4,259,064 A * | 3/1981 | Laux et al. | ..................... | 432/222 |
| 4,522,588 A * | 6/1985 | Todd et al. | ..................... | 432/181 |
| 5,516,571 A * | 5/1996 | Kawamoto | ..................... | 428/116 |
| 5,571,006 A * | 11/1996 | Nakamachi et al. | ............ | 431/11 |
| 5,626,104 A * | 5/1997 | Tanaka et al. | ............... | 122/367.1 |
| 5,695,002 A * | 12/1997 | Tanaka et al. | ..................... | 165/10 |
| 5,890,457 A * | 4/1999 | Tanaka et al. | ............... | 122/367.1 |
| 6,131,644 A * | 10/2000 | Kohara et al. | ................... | 165/10 |
| 6,234,789 B1 * | 5/2001 | Miyata | ......................... | 432/180 |

FOREIGN PATENT DOCUMENTS

| | | |
|---|---|---|
| JP | 51-047131 B | 12/1976 |
| JP | 03-046742 U1 | 4/1991 |
| JP | 09079525 A * | 3/1997 |
| JP | 09184615 A * | 7/1997 |
| RU | 2278325 C1 * | 6/2006 |

* cited by examiner

*Primary Examiner* — Kenneth B Rinehart
*Assistant Examiner* — Jorge Pereiro
(74) *Attorney, Agent, or Firm* — Burr & Brown

(57) ABSTRACT

A heat accumulating-type burner that operates by alternately repeating heat accumulation and combustion where the heat accumulating element is heated by exhaust gas to accumulate heat therein, and combustion air is passed through the heat accumulating portion to preheat the combustion air by thermal exchange with the heat accumulating element that holds the heat accumulated therein, and the preheated combustion air is used to carry out combustion. The cross-sectional area of the heat accumulating portion at the furnace-inner side is made to be smaller than the cross-sectional area of the heat accumulating portion at the air supply/discharge port side, and in addition, the thickness of the fireproof heat insulating member that covers the heat accumulating portion is made to be thick at the furnace-inner side of the heat accumulating portion, and is made to be thin at the air supply/discharge port side of the heat accumulating portion.

9 Claims, 5 Drawing Sheets

HEAT ACCUMULATING-TYPE BURNER

FIELD OF THE INVENTION

The present invention relates to improvements in a heat accumulating-type burner for use in industrial combustion furnace.

BACKGROUND OF THE INVENTION

In recent years, a heat accumulating-type burner is employed in an industrial combustion furnace in order to enhance fuel economy. The heat accumulating-type burner is, as is shown in Patent Document 1 and Patent Document 2, a burner including a heat-accumulating element on an air supply/discharge path of the burner. The burner repeats combustion and exhausts alternately every relatively short period of time of about 30 seconds. In this operation, the heat held by the combustion gas is collected by a heat-accumulating element of the burner under the exhaust condition, whereas the combustion air is passed through the heat-accumulating element of the burner under the combustion condition to preheat the combustion air, so that high thermal efficiency is achieved.

In this heat accumulating-type burner, as shown in FIG. 4 for example, a burner portion 51 and a heat-accumulating portion 52 are connected to each other in series. The reference numeral 53 denotes a furnace wall; 54 a burner tile made of fireproof material; 55 a fuel nozzle; 56 a burner heat insulating wall made of fireproof heat insulating material; and 57 a heat accumulating element made of fireproof material. In this structured heat accumulating-type burner, the burner portion 51 and the heat-accumulating portion 52 are separated from each other. Thus, the thermal stress generated in the heat-accumulating portion 52 resulted from the thermal variation caused by the repeated combustion and air discharge is never applied to the burner portion 51. Therefore, the burner is excellent in durability. However, since most of the burner portion 51 and the whole heat accumulating portion 52 are installed outside the furnace, in order to prevent the heat release from these portions installed outside the furnace, it is required to provide a lining on the burner heat insulating wall 56 made of heat insulating material. Further, the higher the temperature at which the burner is intended to operate at will also prevent sintering fine ceramics from being used (for example, the temperature inside the furnace is 1400° C. or higher), therefore, the fireproof heat insulating wall 56 will be required to have a larger than desired thickness. In this case, there is a problem that the heat accumulating-type burner as a whole becomes large in size.

To solve this problem, there has been suggested a heat accumulating-type burner including a burner portion and a heat accumulating portion integral into one piece unit, as shown in FIG. 5. In FIG. 5, the reference numeral 61 denotes a fuel nozzle; 62 burner tile made of fireproof material; 63 a heat accumulating element made of fireproof material; 64 a burner heat insulating wall made of fireproof heat insulating material; and 65 a furnace wall. Since half or more portions of the burner portion of the heat accumulating-type burner shown in FIG. 5 are installed inside the furnace wall 65, there is an advantage that the portions installed outside the furnace can be reduced in terms of capacities. This heat accumulating-type burner has a structure in which the portion of the heat accumulating element 63 whose temperature will rise to high is located inside the furnace, whereas only the air supply/discharge port side of the heat accumulating element 63 whose temperature is low is located outside the furnace. Due to this structure, the burner heat-insulating wall 64 may be small in thickness, and as a result, the heat accumulating-type burner as a whole can be compact in size. However, in the heat accumulating-type burner shown in FIG. 5, since the burner tile 62 is located adjacent to the heat accumulating element 63, the thermal stress 66 generated in the heat accumulating element 63 resulted from the thermal variation caused by the repeated combustion and air discharge is applied to the burner tile 64. As a result, the burner tile 64 is cracked and damaged, or the burner tile 64 is pushed out to fall into the furnace. Thus, there is a problem in durability.

In such circumstances, there has been a demand for developing a heat accumulating-type burner compact in size but having durability.

[Patent Document 1] Japanese Patent Publication 1976-47131
[Patent Document 2] Japanese Laid-Open Utility Model Publication 1991-46742

SUMMARY OF THE INVENTION

Problems to be Solved by the Invention

Therefore, an objective of the present invention is to solve the problems residing in the prior arts described above, and to provide a heat accumulating-type burner compact in size but having durability.

Means by which the Problems are Solved

To solve the problems described above, the present invention is characterized in a heat accumulating-type burner, comprising a heat accumulating portion including a heat accumulating element in it, said heat accumulating-type burner operating by alternately repeating heat accumulation and combustion where exhaust gas is passed through said heat accumulating portion to heat said heat accumulating element so as to accumulate heat therein, and then, combustion air is passed through said heat accumulating portion to preheat said combustion air by thermal exchange with said heat accumulating element holding the heat accumulated therein, and said preheated combustion air is used to carry out combustion, wherein a cross-sectional area of said heat accumulating portion at a furnace-inner side is made to be smaller than a cross-sectional area of said heat accumulating portion at an air supply/discharge port side, and in addition, a thickness of a fireproof heat insulating member that covers said heat accumulating portion is made to be thick at the furnace-inner side of the heat accumulating portion, whereas is made to be thin at the air supply/discharge port side of said heat accumulating portion.

It is preferable that the burner tile through which the combustion air and the exhaust gas pass and to which a fuel is supplied is made of fireproof material, and that the burner tile is covered with a fireproof heat insulating member. Further, it is preferable that the heat-accumulating portion is substantially in the shape of circular cone or substantially in the shape of rectangular cone shape. Further, it is preferable that plate-like ceramic honeycombs adjacent to each other are provided within their respective heat accumulating portions into a layered state with an interval created therebetween, and that the combustion air and the exhaust gas are passed through the ceramic honeycombs.

Further, it is preferable that the cross sectional area of the heat accumulating portion at the furnace-inner side is made to be 1/10 to 1/2 of the cross-sectional area of the heat accumulating portion at the air supply/discharge port side.

Effect of the Invention

In the heat accumulating-type burner of the present invention, the cross-sectional area of the heat accumulating portion at the furnace-inner side is made to be smaller than the cross-sectional area of the heat accumulating portion at the air supply/discharge port side, and in addition, the thickness of the fireproof heat insulating member covering the heat accumulating portion is made to be thick at the furnace-inner side of the heat accumulating portion, whereas it is made to be thin at the air supply/discharge port side of the heat accumulating portion. The heat-accumulating portion at the furnace-inner side to be exposed to high temperature is covered with the fireproof heat-insulating member large in thickness, and thus, can be sufficiently heat-insulated. Further, since the cross-sectional area of the heat-accumulating portion at the air supply/discharge port side at a low temperature is large, a heat capacity required for accumulating heat can be ensured, and heat can be accumulated efficiently. As a result, the heat-accumulating portion can be compact in size as compared with conventional ones, and it becomes possible to provide a heat accumulating-type burner that is compact in size.

Further, the burner tile through which the combustion air and the exhaust gas are passed and to which the fuel is supplied is made of fireproof material, and the burner tile is covered with the fireproof heat-insulating member. Thus, the burner tile is not required to have heat-insulating function. As a result, a fireproof material that is fine (i.e., high in density) and high in strength can be employed to constitute the burner tile, thereby increasing the durability of the burner tile. As described above, it becomes possible to employ a fireproof material having durability to constitute the burner tile. Even if a throat diameter, which is a diameter of the flow path through which the combustion air and the exhaust gas are passed, is made into a small diameter, and as a result, the flow rate of the combustion air and the exhaust gas increases, the burner tile is never damaged. Thus, the burner tile can be compact in size, and it becomes possible to provide a heat accumulating-type burner compact in size.

Further, when the heat-accumulating portion is made substantially into the shape of circular cone or substantially into the shape of rectangular cone, it becomes easy to manufacture the fireproof heat-insulating member that covers the heat-accumulating portion.

Further, when the ceramic honeycomb is provided inside the heat accumulating portion, and the combustion air and the exhaust gas are passed through the ceramic honeycomb, since the surface area of the ceramic honeycomb at its portion through which the combustion air and the exhaust gas are passed through is large, thermal exchange is carried out efficiently. As a result, the heat-accumulating portion can be compact in size, and it becomes possible to provide a heat accumulating-type burner compact in size. Further, when plate-like ceramic honeycombs adjacent to each other are provided into a layered state with an interval created therebetween, the combustion air and the exhaust gas pass through the interval, and the flow path for the combustion air and the exhaust gas is never clogged.

DETAILED DESCRIPTION OF THE INVENTION

First Embodiment

Figure 1:
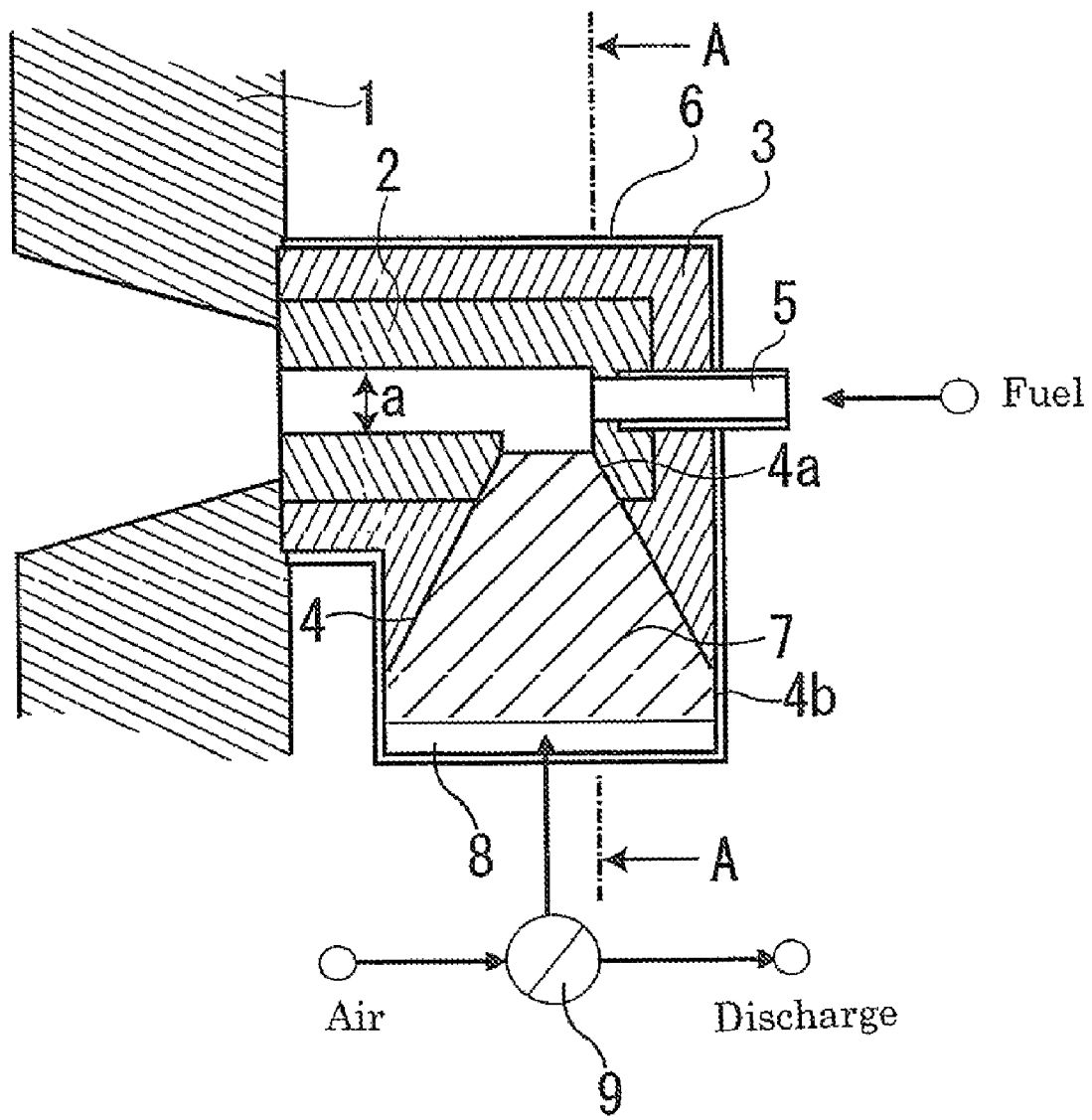
FIG. 1 is a side cross-sectional view of a heat accumulating-type burner showing an embodiment of the present invention.

Hereinafter, a preferred embodiment of the present invention will be described referring to the drawings.

Figure 2:
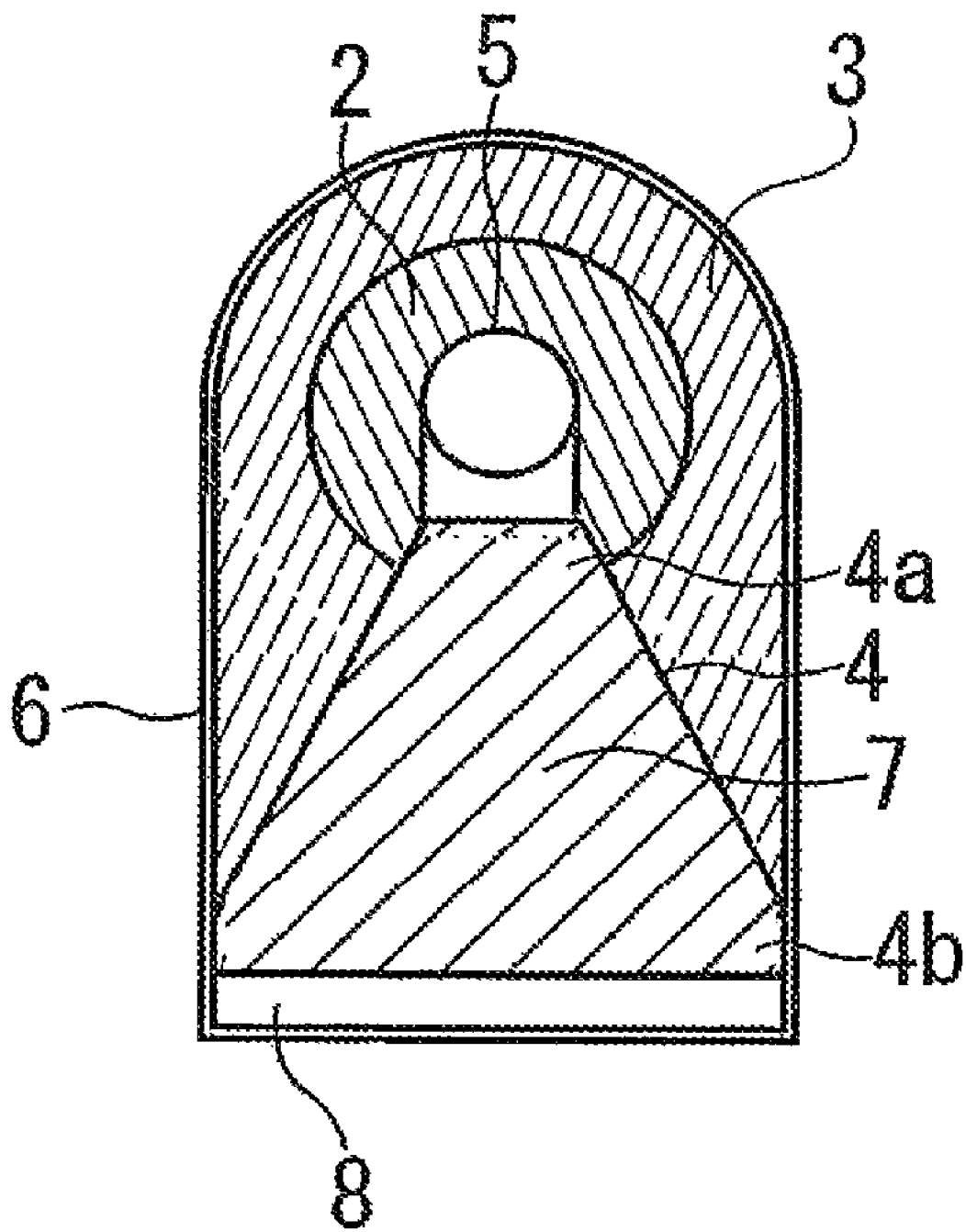
FIG. 2 is a frontal cross-sectional view of a heat accumulating-type burner showing an embodiment of the present invention.

FIG. 1 is a side cross-sectional view showing an embodiment of the present invention, and FIG. 2 is a cross-sectional view taken along the line A-A of FIG. 1. The reference numeral 1 denotes a furnace wall of an industrial combustion furnace. A heat accumulating-type burner of the present invention is attached onto the furnace wall 1. The heat accumulating-type burner of the present invention is mainly comprised of a burner tile 2, a heat-insulating wall 3, a heat-accumulating portion 4, a fuel nozzle 5, and a housing 6.

The burner tile 2 is made of a fireproof material such as a fine fireproof roof tile and the like. In this embodiment, the burner tile 2 is substantially in the shape of cylinder, and is arranged such that the inside of the burner tile 2 communicates with an opening portion of the furnace wall 1. Alternatively, there will be no problem if the burner tile 2 is made of castable fireproof material.

The fuel nozzle 5 is located so that it opens at the bottom portion of the burner tile 2. A fuel is supplied from this fuel nozzle 5. In this embodiment, a gaseous fuel such as liquefied petroleum gas (LPG), liquefied natural gas (LNG), and the like. Alternatively, there will be no problem if liquefied fuel such as heavy oil is mixed with combustion air and thus-obtained mixture is used as a fuel. In this embodiment, the fuel nozzle 5 is located so that it opens at the bottom portion of the burner tile 2, there will be no problem if the fuel nozzle 5 is alternatively opened at the side surface of the burner tile 2.

The burner tile 2 is covered with a fireproof heat-insulating member 3. The fireproof heat-insulating member 3 is made of fireproof heat insulating roof tile or castable fireproof heat insulating member. The heat-accumulating portion 4 is constituted by the fireproof heat-insulating member 3 so that the heat-accumulating portion 4 opened to the flow path of the burner tile 2. The heat-accumulating portion 4 is opened in the direction substantially orthogonal to the axial direction of the flow path of the burner tile 2. In this embodiment, the heat-accumulating portion 4 is opened at the lower side surface of the burner tile 2.

Inside the heat-accumulating portion 4, there is provided a heat-accumulating element 7 made of fireproof material. As the heat-accumulating element 7, for example, a spherical or a cylindrical filling member is employed. The heat-accumulating element 7 is held by a wire mesh provided to the bottom portion of the heat-accumulating portion 4. Even when the combustion air passes through the heat accumulating portion 4, the heat accumulating element 7 never moves toward the inside of the furnace due to its own weight. The fireproof heat-insulating member 3 is covered with a metallic housing 6.

The bottom portion of the heat-accumulating portion 4 is an air supply/discharge port 8. In combustion, combustion air is supplied from the air supply/discharge port 8. In heat accumulation, exhaust gas is exhausted from the air supply/discharge port 8. By switching a switch valve 9 every predetermined period of time (for example, every 30 seconds), the supply of combustion air and the exhaust of exhaust gas is alternately conducted.

In combustion, an unillustrated blower is activated to supply combustion air through the air supply/discharge port 8 to the bottom portion of the burner tile 2, so that the fuel supplied from the fuel nozzle 5 is burned. When a predetermined period of time has elapsed, the switch valve 9 is switched to aspirate exhaust gas through the air supply/discharge port 8 to exhaust the exhaust gas out of the furnace. At this time, the exhaust gas at high temperature passes through the heat-accumulating portion 4. The exhaust gas comes into contact with the surface of the heat-accumulating element 7 charged within the heat-accumulating portion 4 to induce heat exchange therebetween. As a result, the heat-accumulating element 7 is heated to accumulate heat therein.

After a predetermined period of time has elapsed, the switch valve 9 is switched again to supply combustion air through the air supply/discharge port 8. At this time, the combustion air passes through the heat-accumulating portion 4 to come into contact with the surface of the heat-accumulating element 7 which accumulates heat. As a result, the combustion air is heat-exchanged and pre-heated, and then, is supplied to the burner tile 2. As described above, the operation is conducted by alternately repeating heat accumulation and combustion to collect the heat held by the combustion exhaust gas into the heat-accumulating element 7. Then, the combustion air is passed through the heat-accumulating element 7 to pre-heat the combustion air. In this manner, high heat efficiency can be achieved and fuel economy is improved.

In the present invention, the cross-sectional area of the heat accumulating portion at the furnace-inner side $4a$ is made to be smaller than the cross-sectional area of the heat accumulating portion at the air supply/discharge port side $4b$. At the same time, the thickness of the fireproof heat-insulating member 3 covering the heat-accumulating portion 4 is made to be thick at the heat-accumulating portion 4 at the furnace-inner side $4a$, whereas the thickness is made to be thin at the heat-accumulating portion 4 at the air supply/discharge port side $4b$. In this structure, the heat accumulating portion at the furnace-inner side $4a$ to be exposed to high temperature (at 1000° C. to 1600° C.: in this embodiment, at 1400° C.) is covered with the fireproof heat insulating member 3 great in thickness, so that the heat accumulating portion at the furnace-inner side $4a$ can be sufficiently heat-insulated. Contrarily, since the heat-accumulating portion at the air supply/discharge port side $4b$ is at a low temperature (100° C. to 400° C.: in this embodiment, at 200° C.) having a large cross-sectional area, a heat capacity required for accumulating heat can also be ensured.

It is preferable that the cross-sectional area of the heat-accumulating portion 4 at the furnace-inner side is 1/10 to 1/2 of the cross-sectional area of the heat-accumulating portion 4 at the air supply/discharge port side. If this cross-sectional area ratio is too small, the flow resistances of the combustion exhaust gas and the combustion air become too large, and an increase in the pressure loss is induced, and in addition, the fluidity of the heat-accumulating portion 4 at its peripheral edge portion tends to be poor. Contrarily, if this cross-sectional area ratio is too large, the structure resembles conventional ones, and the effect of the present invention decreases. In this embodiment, the shape of the heat accumulating portion 4 is substantially circular conical or substantially rectangular conical. However, the shape is not necessarily limited thereto.

In the present invention, since the burner tile 2 is covered with the fireproof heat-insulating member 3, the burner tile 2 is not required to have a heat insulating function. Thus, it becomes possible to use a fireproof material that is fine (i.e., high in density) and high in strength to constitute the burner tile 2, thereby enhancing the durability of the burner tile 2. To downsize the heat accumulating-type burner, it is required to reduce the throat diameter a, that is a diameter of the flow path through which the combustion air and the exhaust gas passes, to a combustible minimum diameter. The flow rates of the combustion air and the exhaust gas increase with reducing the throat diameter a. Even in this structure, since the burner tile 2 is made of fireproof material fine and high in strength as has been described above, the burner tile 2 is never damaged.

Second Embodiment

Figure 3:
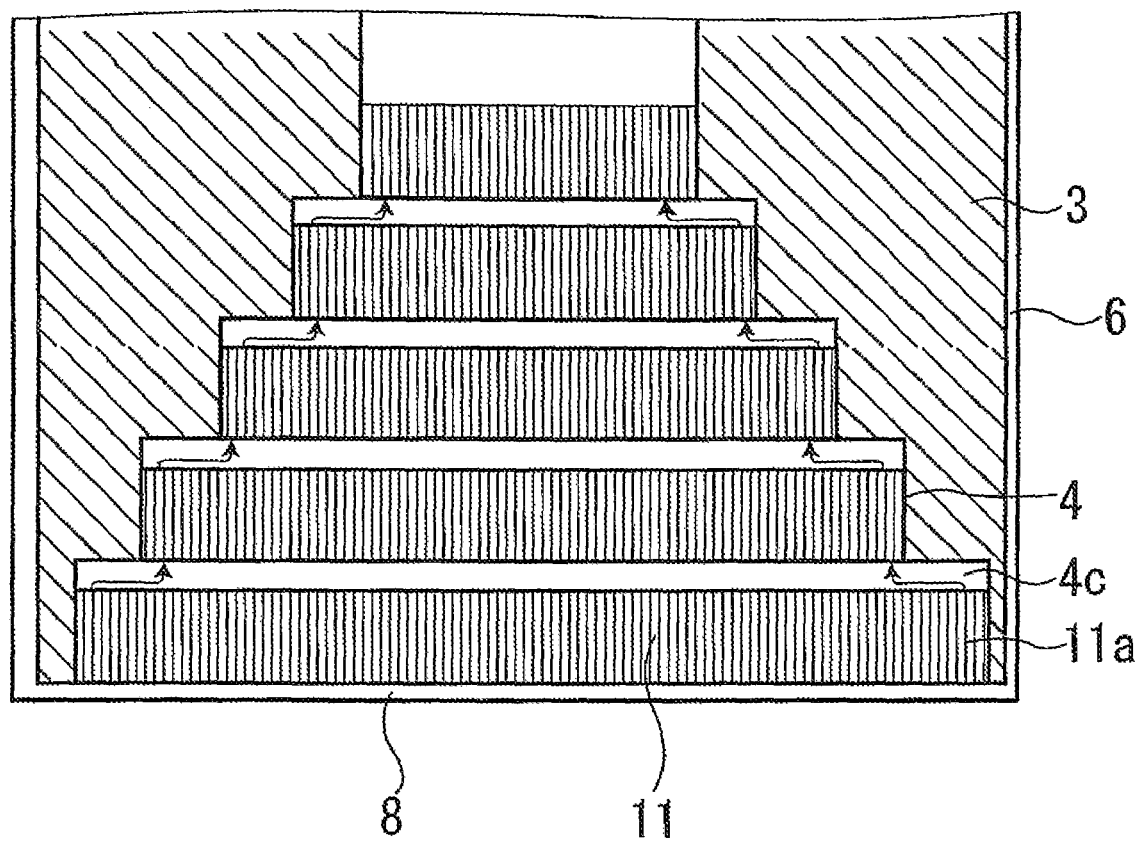
FIG. 3 is a detailed view of a heat-accumulating portion of a second embodiment of the present invention.
Figure 4:
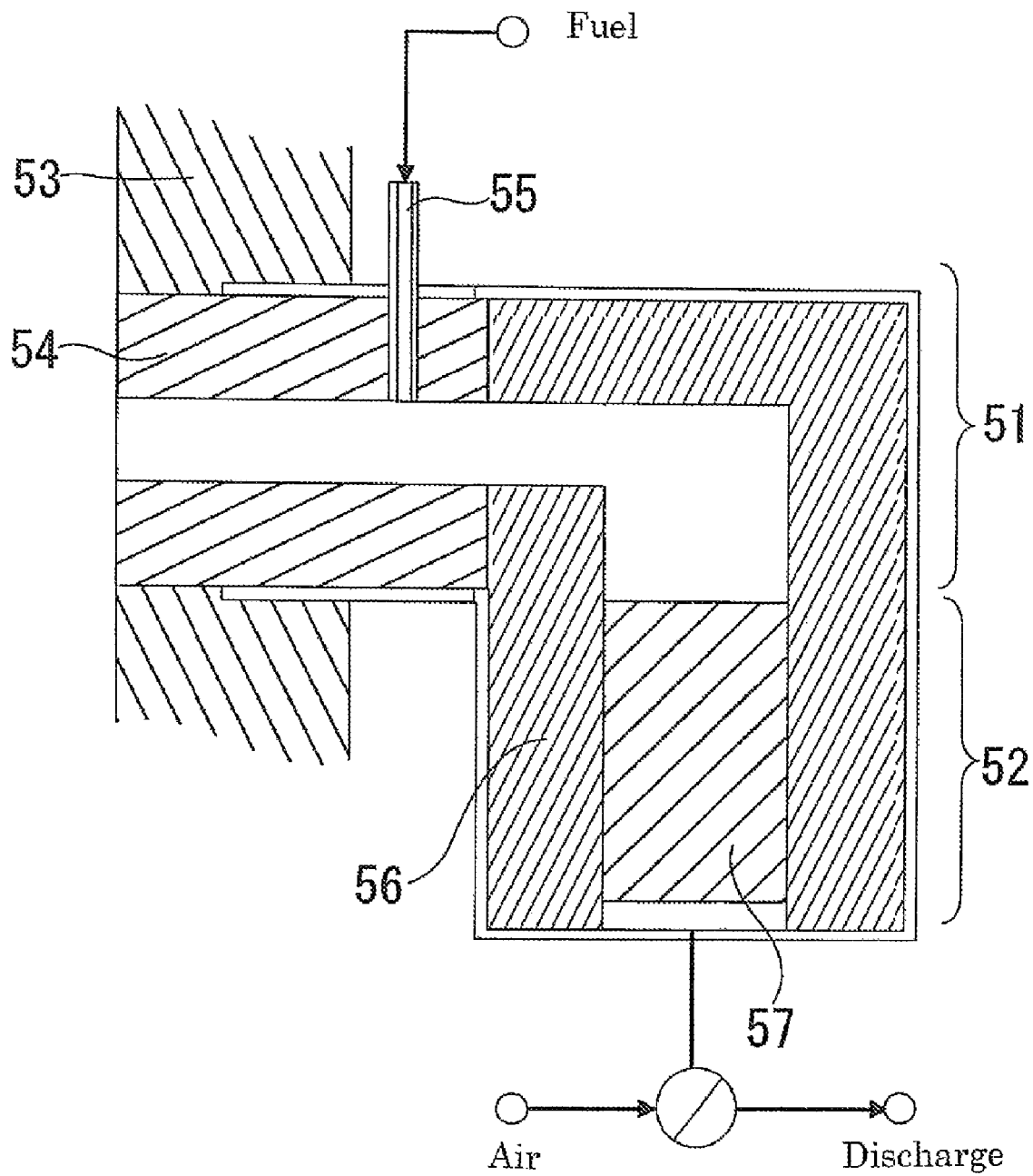
FIG. 4 is an illustrative diagram showing a conventional heat accumulating-type burner.
Figure 5:
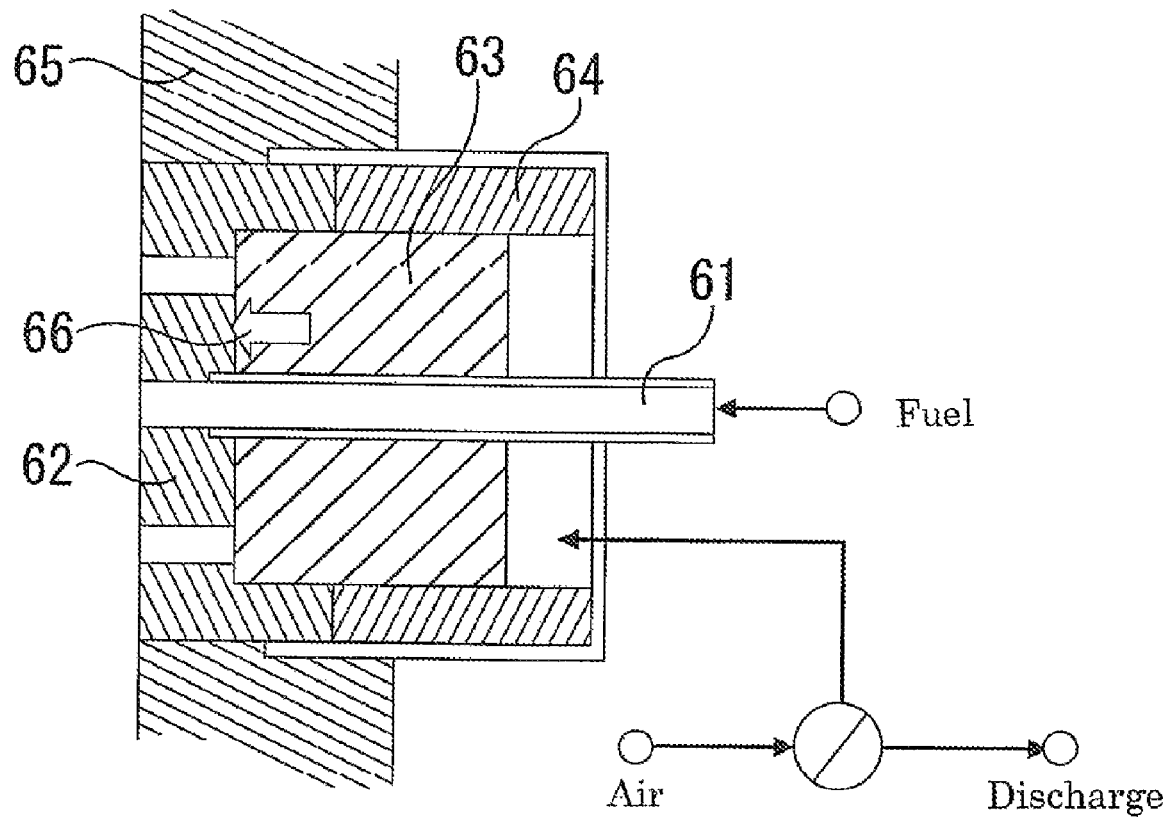
FIG. 5 is an illustrative diagram showing a conventional heat accumulating-type burner.

Next, a second embodiment will be described. FIG. 3 shows a detailed view of a heat-accumulating portion of a second embodiment. In this second embodiment, a ceramic honeycomb is employed as a heat-accumulating element. Here, the ceramic honeycomb means a honeycomb structure in which hexagons, rectangles, and the like made of ceramic is tightly bound into one-piece unit. As shown in FIG. 3, in this second embodiment, plate-like ceramic honeycombs 11 adjacent to each other are provided within the heat accumulating portions 4 into a layered structure with an interval $4c$ created therebetween. Combustion air and exhaust gas are passed through the ceramic honeycombs 11. Due to the honeycomb structure, each ceramic honeycomb 11 has a large surface area, which enables efficient heat exchange of the combustion air and the exhaust gas passing therethrough.

The heat accumulating portions 4 are made into the shapes corresponding to their respective ceramic honeycombs 11 arranged in a layered structure. The width of each heat-accumulating portion 4 is wider than the immediately adjacent one as their positions gradually approach from the furnace-inner side toward the air supply/discharge port 8 side. Accordingly, the width of each ceramic honeycomb 11 is also wider than the immediately adjacent one as their positions gradually approach from the furnace-inner side toward the air supply/discharge port 8 side. Covered with the fireproof heat-insulating member 3 great in thickness, the heat-accumulating portion 4 at the furnace-inner side, which will be exposed to high temperature, can be sufficiently heat-insulated. On the other hand, since the ceramic honeycomb 11 in the heat-accumulating portion 4 at the air supply/discharge port side 8 is at a low temperature having a large cross-sectional area, a heat capacity required for accumulating heat can be ensured, so that heat can be efficiently accumulated.

As described above, the reason why the ceramic honeycombs 11 are arranged with the intervals 4 created therebetween is to ensure the flow path for the combustion air and the exhaust gas. As shown by the arrow in FIG. 3, the combustion air and the exhaust gas, having passed through the outer edge portion $11a$ of each ceramic honeycomb 11, pass through the intervals $4c$, and as a result, pass into the next ceramic honeycomb 11.

In the above, the present invention has been described by way of the embodiments, which are conceived as being the most practical and preferred at the current point of time. However, the present invention is not limited to the embodiments disclosed in the specification of the present application, and may be properly modified within the gist of the invention readable from the claims and the entire specification, or within the range without departing from the principles of the invention. It should be understood that the heat accumulating-type burner involving such modifications are also encompassed within the technical range of the present invention.

The invention claimed is:

1. A heat accumulating burner, comprising a burner tile, a heat accumulating portion including a heat accumulating element in it, said heat accumulating burner operating by alternately repeating heat accumulation and combustion where exhaust gas is passed through said heat accumulating portion to heat said heat accumulating element so as to accumulate heat therein, and then, combustion air is passed through said heat accumulating portion to preheat said combustion air by thermal exchange with said heat accumulating element holding the heat accumulated therein, and said preheated combustion air is used to carry out combustion, wherein said heat accumulating element extends orthogonally with respect to a flow passage through said burner tile, a cross-sectional area of said heat accumulating element at a furnace-inner side is made to be smaller than a cross-sectional area of said heat accumulating element at an air supply/discharge port side, and a thickness of a fireproof heat insulating member that covers said heat accumulating element is thicker at the furnace-inner side of the heat accumulating element than at the air supply/discharge port side of said heat accumulating element, wherein said heat insulating member has a tapered inner surface and an opening in said burner tile has a tapered inner surface, and wherein said heat insulating member tapered inner surface and said burner tile opening tapered inner surface co-exist and extend along a common inclined surface to form a single and substantially integral tapered opening through which the preheated combustion air flows.

2. A heat accumulating burner according to claim 1, wherein a fireproof material is employed to constitute said burner tile through which the combustion air and the exhaust gas are passed and to which a fuel is supplied, and said burner tile is covered with a fireproof heat insulating member.

3. A heat accumulating burner according to claim 2, wherein said heat accumulating portion is substantially in the shape of circular cone or substantially in the shape of rectangular cone.

4. A heat accumulating burner according to claim 2, wherein ceramic honeycombs adjacent to each other are provided within their respective heat accumulating portions into a layered state with an interval created therebetween, and the combustion air and the exhaust gas are passed through said ceramic honeycombs.

5. A heat accumulating burner according to claim 2, wherein a cross-sectional area of the heat accumulating portion at a furnace-inner side is made to be $1/10$ to $1/2$ of the cross-sectional area of the heat accumulating portion at an air supply/discharge port side.

6. A heat accumulating burner according to claim 1, wherein said heat accumulating portion is substantially in the shape of circular cone or substantially in the shape of rectangular cone.

7. A heat accumulating burner according to claim 1, wherein ceramic honeycombs adjacent to each other are provided within their respective heat accumulating portions into a layered state with an interval created therebetween, and the combustion air and the exhaust gas are passed through said ceramic honeycombs.

8. A heat accumulating burner according to claim 1, wherein a cross-sectional area of the heat accumulating portion at a furnace-inner side is made to be $1/10$ to $1/2$ of the cross-sectional area of the heat accumulating portion at an air supply/discharge port side.

9. A heat accumulating burner according to claim 1, wherein said burner tile has an opening that extends orthogonally with respect to the flow passage through said burner tile at a bottom surface thereof, and wherein an upper portion of said heat accumulating portion extends into said opening.

* * * * *